United States Patent Office 3,226,438
Patented Dec. 28, 1965

3,226,438
METHOD FOR THE PREPARATION OF TRIAMINOGUANIDINE
Phyllis D. Oja, Walnut Creek, Calif., and Gordon E. Hartzell, Midland, Mich., assignors to The Dow Chemical Company, Midland, Mich., a corporation of Delaware
No Drawing. Filed Feb. 1, 1960, Ser. No. 6,059
6 Claims. (Cl. 260—564)

The present invention relates to a method for the preparation of triaminoguanidine.

Triaminoguanidine, a compound having the following formula,

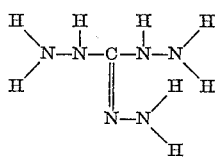

has pronounced utility as an additive in high energy fuels intended for use in missiles or space craft. It may be combined in such fuels, both liquid and solid, in a variety of known ways.

Heretofore it has not been possible to obtain triaminoguanidine of the purity required for the above uses. Whenever an attempt has been made in the past to prepare triaminoguanidine, it has failed because the compound decomposes very rapidly and hence it cannot be recovered. This failure is due to the instability under most conditions of guanidine and many of its derivatives which are rarely, if ever, prepared as such. Instead, it usually has been customary to prepare the strong mineral acid salts of these materials. In the above described applications, such salts are completely unsatisfactory.

The principal object of the present invention is to provide a method for the preparation of triaminoguanidine. Another object is the preparation of triaminoguanidine in essentially pure form. A further object is the provision of an improved method for the preparation of triaminoguanidine in which the product is prevented from undergoing excessive decomposition and thereafter may be stored until it is desired to be used.

The above and other objects are attained according to the invention by contacting an aqueous solution of a salt of triaminoguanidine with a strongly basic quaternary ammonium anion exchange resin while the latter is in the basic form, thereby forming an aqueous solution of free triaminoguanidine. The solution is concentrated at least until a solution having a two molar concentration of triaminoguanidine is obtained. To the concentrated solution, at least 2 volumes of an organic water solvent is added for each volume of the concentrated solution and the triaminoguanidine is then crystallized from the resulting mixture and dried substantially free of the water and solvent. The product thus obtained may be stored almost indefinitely in a dry, inert atmosphere without appreciable decomposition.

The various known strongly basic anion exchange resins in the basic form may be used to convert the acid salts of triaminoguanidine to the free base. These anion exchange resins include the resinous quaternary ammonium bases derived from a reaction product of a tertiary amine and an insoluble cross-linked copolymer of a monovinyl aromatic hydrocarbon and a divinyl aromatic hydrocarbon, which copolymer contains halomethyl groups on its aromatic nuclei, such as described in United States Letters Patent Nos. 2,591,573 and 2,597,494.

The salts of triaminoguanidine which are generally used in carrying out the present invention are the hydrochloride, the hydrobromide, and the hydroiodide salts. Salts derived from other strong mineral acids, such as sulfuric acid, phosphoric acid and nitric acid and salts derived from strong organic acids, such as benzenesulfonic acid and trifluoroacetic acid, may also be used. These salts may be prepared by the well known prior art methods. It is preferred to use the hydrochloride salt, because it may be most conveniently prepared.

The triaminoguanidine acid salt is dissolved in water for use according to the invention. A solution having a concentration of from at least 0.2 molar to saturation is used. If the concentration is less than about 0.2 molar, an unnecessarily large volume of water must be handled. Thus, a more concentrated solution of the salt is advantageously employed.

The aqueous solution of the triaminoguanidine salt is contacted with the strongly basic quaternary ammonium anion exchange resin by use of conventional methods. As is well known, the most effective method usually consists of passing the solution through a column of the resin. As a result of this operation, there is obtained an aqueous solution of the triaminoguanidine as a free base. It has been found that the rate of decomposition of triaminoguanidine is greatly increased in the presence of water especially in an atmosphere containing oxygen. Thus, the remaining steps in the process are carried out relatively rapidly and the solution is maintained in an atmosphere substantially free of oxygen. Once the aqueous solution is obtained, it is generally subjected to the remaining steps in the process and the product triaminoguanidine obtained therefrom within not more than 12 hours, and preferably within 1 hour.

The aqueous solution of triaminoguanidine obtained from the ion exchange operation is concentrated to remove a major proportion of the water. Any of a number of methods may be used for this step provided they are adaptable to being carried out at a relatively low temperature and in the substantial absence of oxygen. Suitable methods that are known in the art include freeze drying, flash evaporation, and vacuum distillation. In the case of the latter, it is preferable to carry out the distillation under not more than 25 mm. of mercury absolute pressure and at a temperature below about 50° C. The concentration step is carried out until at least a two molar solution of triaminoguanidine is obtained. In a preferred operation the water is removed until the concentration of triaminoguanidine reaches 9.0 to 9.5 molar.

To the concentrated solution, an organic water solvent which is substantially a nonsolvent for the triaminoguanidine is added. The solvent is preferably added after the concentration step has been completed. However, with the higher boiling point solvents or diluents, it may be desirable at times to add the solvent prior to the completion of the concentrating step. For example, after the solution has been concentrated to about a 2 to 7 molar solution of triaminoguanidine, the solvent may be added and the water removal then continued at least until the mixture becomes essentially saturated with respect to the triaminoguanidine.

During the concentrating step, the solution is maintained in an environment substantially free of oxygen. In vacuum distillation or flash evaporation, the vapors protect the solution from contact with air. However, when other methods are used, an inert atmosphere, such as nitrogen, helium, argon and the like is employed. After concentration the solution is also maintained in an atmosphere substantially free of oxygen until after the solvent is added. Preferably this is accomplished by maintaining a vacuum over the concentrated solution, but it also may be obtained by providing an inert atmosphere in the vessel wherein the concentrated solution is contained.

The solvents applicable in the above step of the present invention are characterized by, besides the property of being nonreactive with triaminoguanidine, the fact that they are solvents for water. It is preferred to use a solvent which has very little if any solvent action upon the triaminoguanidine. When appreciate amounts of triaminoguanidine dissolve in the solvent the product is lost. A number of liquids are found useful in this step. Dimethylformamide and dimethylacetamide are the preferred solvents. Other solvents such as 1,2-dialkoxyethanes where the alkyl radicals have up to 4 carbon atoms, such as 1,2-dimethoxyethane, 1,2-diethoxyethane, 1,2-dibutoxyethane; alkoxyethanols where the alkyl radical has up to 4 carbon atoms, such as 2-ethoxyethanol and diethyleneglycolethylether; and lower aliphatic alcohols having up to 5 carbon atoms, such as ethanol, isopropanol, and n-butanol may be used, but the yields are considerably lower. In general, it is preferred to use solvents that are higher boiling in relation to water than those that are lower boiling. With such a preferred diluent, the water removing step may be easily continued after addition of the solvent. For this reason, dimethylformamide is also preferred.

The volume of solvent to be added depends upon the volume of concentrated solution being processed and the solvent used. Sufficient amount of the solvent must be used to dissolve all of the water present. For example, with a solvent, such as 1,2-dibutoxyethane which has a limited solubility for water, sufficient amount must be added to obtain a homogeneous solution. Generally from 2 to 10 volumes of solvent per volume of concentrated triaminoguanidine-containing solution are sufficient and are used. It is preferred to employ from about 4 to 7 volumes of the solvent per volume of concentrated solution.

In addition to obtaining crystallization by the addition of the solvent which has a "salting out" effect, further crystallization of triaminoguanidine is generally obtained by cooling the mixture. The mixture may be seeded with small particles to aid in the crystallization, if desired. A slurry of the triaminoguanidine may be thus obtained in the solvent containing the minor proportion of water. Essentially all the triaminoguanidine crystallizes out and may be separated from the liquid by any of a number of solid-liquid separation techniques, such as filtration, centrifugation, and decantation. Since the amount of water present is small and this small amount of water is further diluted with the solvent, the crystallization and separation of the crystallized triaminoguanidine from the mixture may be carried out in air without excessive decomposition of the triaminoguanidine. However, optimum results are achieved when contact with oxygen is maintained at a minimum. Thus, when filtration or centrifugation is used, it is preferred to carry out the operation under an inert atmosphere since otherwise the triaminoguanidine would be contacted with large volumes of air.

The recovered triaminoguanidine contains a residue of the solvent together with remaining traces of water. These constituents are generally removed by drying. It is generally preferred to wash the triaminoguanidine with a water solvent inert to triaminoguanidine, such as with additional amounts of the water solvent used as the crystallization diluent, or a volatile liquid, such as acetone, to further decrease the water concentration before drying. After the triaminoguanidine has been washed, the product is then dried. The drying is most conveniently accomplished by vaporizing the wash liquid by use of a vacuum. The product may also be dried by heating, but the temperature must be maintained below 50° C. and an inert atmosphere used.

The following examples further illustrate the invention.

*Example I*

Two hundred and fifty milliliters of a solution containing 35 grams of triaminoguanidine hydrochloride in water were passed through a 1.5 inch by 12 inch column of −50+100 mesh strongly basic quaternary ammonium anion exchange resin similar to that disclosed in U.S. Patent No. 2,591,573. The resin had been placed in the basic form by treatment with a 1.0 N aqueous solution of sodium hydroxide. The pH of the column effluent was monitored in order to insure that only solution containing free base triaminoguanidine was collected. Thus, 250 ml. of solution at a pH of 11 were obtained containing about 12 grams of free triaminoguanidine.

The latter solution was placed in a vessel which was evacuated by means of an aspirator. The solution was then evaporated gently over a steam bath, while the vacuum was maintained, until about 75 percent of the volume had been removed. The temperature of the evaporating solution was about 35° C. while the pressure in the vessel was about 25 mm. of mercury absolute. The solution so concentrated was cooled, and without releasing the vacuum, about 2.4 volumes (150 ml.) of dimethyl formamide per volume of concentrated solution were added. The vacuum was then released and the vessel was immersed in an ice water bath, resulting in an immediate precipitation of the triaminoguanidine.

The solid product was rapidly separated by filtration and washed rapidly with acetone. The washed product was then placed in a vacuum chamber and allowed to dry at ambient temperature under vacuum. There were thus obtained 8.7 grams of free base triaminoguanidine which was capable of being stored in a dry, oxygen-free atmosphere. No decomposition could be detected after the product was stored for three months at room temperature in a closed container containing a nitrogen atmosphere.

*Example II*

Two hundred fifty milliliters of an aqueous solution containing 35 grams of triaminoguanidine hydrochloride were passed through the anion exchange resin column described in Example I, and 250 ml. of column effluent at a pH of 11 were collected. Eighty percent by volume of the solution was removed by evaporation under an aspirator vacuum as in Example I. Without releasing the vacuum, 3 volumes (150 ml.) of dimethyl formamide per volume of concentrated solution was added. Free, crystalline triaminoguanidine began to form immediately, increasing in quantity when the vessel was cooled in an ice water bath. The solid product was rapidly separated by filtration and washed with several portions of acetone. When dried under vacuum as in Example I, there were obtained 10.1 grams of stable triaminoquanidine.

*Example III*

Two hundred milliliters of an aqueous solution containing 28 grams of triaminoguanidine hydrochloride were passed through the anion exchange resin column described in Example I. After all of the solution had been added to the column, deionized water was used to wash the column. All the column effluent between a pH of 8 and a pH of 11 was collected. This amounted to 570 ml. of solution containing free triaminoguanidine. Eighty-three percent by volume of this solution was removed by evaporation at 40°–50° C. at about 25 mm. of mercury pressure, as in Example I. The solution was then cooled and 250 ml. of dimethyl formamide were added. After filtration, washing with acetone, and drying, 12 grams of triaminoguanidine were recovered.

*Example IV*

In a manner similar to that described in Example I, 250 ml. of an aqueous solution containing 35 grams of triaminoguanidine hydrochloride were converted to 250 ml. of an ion exchange column effluent at a pH of 11 containing free triaminoguanidine. Eighty-eight percent by volume of the latter solution was removed by vacuum evaporation as in Example I and 6.7 volumes (200 ml.) of dimethylformamide were admitted, after which the vacuum was released. The mixture was then cooled and immersed in an ice bath to complete the crystallization. The product triaminoguanidine was filtered, washed with acetone, and dried under vacuum. A stable, pure triaminoguanidine in an amount of 10.2 grams was obtained.

*Example V*

Triaminoguanidine hydrochloride was prepared by reacting 10.0 moles of guanidine hydrochloride with 30.0 moles of hydrazine hydrate (85 percent). The reactants were placed in a reaction vessel, agitated mildly, and heated on a steam bath for 3.5 hours and then gradually allowed to cool to ambient temperature. After standing for 16 hours, a large amount of solid triaminoguanidine hydrochloride had formed. This product was separated by filtration. There was thus obtained 1180 grams of triaminoguanidine hydrochloride, melting at 236.5°–237.5° C.

The above product was dissolved in distilled water to form a 1 molar solution. Six hundred milliliters of the solution was passed through a 2.5 inch by 22 inch column of the anion exchange resin described in Example I. This resin had previously been placed in the basic form. After the passage of the 600 ml. of solution, the column was washed with water. There was obtained 900 ml. of a solution of free triaminoguanidine at a pH of 11 which included the wash effluent.

Two hundred and fifty milliliters of the latter solution were placed in an evaporation vessel. The vessel was evacuated to a pressure of about 25 mm. of mercury and the solution heated over a steam bath to evaporate the water at about 40° C. When sufficient water had been evaporated so that the volume of the solution in the flask had been reduced to about ⅔ of its original volume, an additional 100 ml. of the triaminoguanidine solution were added without allowing air to enter. This procedure was continued until all of the 900 ml. of the ion exchange column effluent had been added and the volume of the concentrated solution remaining reduced to about 100 ml. To the concentrated solution, 250 ml. of dimethyl formamide were added and the evaporation continued until essentially all the water had been removed. The flask was chilled in an ice bath to crystallize the triaminoguanidine. The product was separated rapidly by filtration, washed with acetone, and dried under vacuum at ambient temperature to give 28.1 grams of free triaminoguanidine.

*Example VI*

The 1.0 molar aqueous solution of triaminoguanidine prepared in Example V was used in this experiment. One hundred and twenty-five milliliters of the solution were evaporated under the conditions of Example V until about 75 percent by volume of the water had been removed. Thereupon 70 ml. of 1,2-dibutoxyethane was added without releasing the vacuum, and evaporation was continued until the remaining water and about 50 percent by volume of the 1,2-dibutoxyethane had been removed.

The vessel was then chilled and the solid triaminoguanidine so formed was separated by filtration and washed with about 100 ml. of isopropanol.

In a manner similar to that above the run was repeated except that 1,2-dimethoxyethane was used as the nonsolvent in place of 1,2-dibutoxyethane. In place of the 1,2-dimethoxyethane, 2-ethoxyethanol and diethyleneglycolethylether may also be used.

What is claimed is:

1. A process for the preparation of triaminoguanidine, which comprises contacting an aqueous solution of an acid salt of triaminoguanidine with a strongly basic quaternary-ammonium anion exchange resin in the hydroxyl form to convert the acid salt in the solution to triaminoguanidine, concentrating the so-formed aqueous solution of triaminoguanidine in the substantial absence of oxygen until the concentration of the triaminoguanidine is at least two molar in the concentrated solution, adding to the concentrated solution at least 2 volumes of an organic solvent in which water is soluble, said organic solvent being substantially a nonsolvent for triaminoguanidine for each volume of said concentrated solution, said addition being carried out in the substantial absence of oxygen, crystallizing the triaminoguanidine in the resulting mixture, separating the crystallized triaminoguanidine from the resulting mixture, and drying the crystallized triaminoguanidine to remove essentially all of the water and organic nonsolvent for triaminoguanidine from the product.

2. A process for the preparation of triaminoguanidine, which comprises contacting an aqueous solution of an acid salt of triaminoguanidine with a strongly basic quaternary-ammonium anion exchange resin in the hydroxyl form to convert the acid salt in the solution to triaminoguanidine, distilling the so-formed aqueous solution of triaminoguanidine at a temperature below 50° C. to remove the water until the concentration of the triaminoguanidine is at least two molar in the remaining concentrated solution, adding to the concentrated solution from 2 to 10 volumes of an organic solvent in which water is soluble, said organic solvent being substantially a nonsolvent for triaminoguanidine for each volume of said concentrated solution, said addition being carried out in the substantial absence of oxygen, cooling the resulting mixture to crystallize the triaminoguanidine, separating the crystallized triaminoguanidine to remove essentially all of the organic non-solvent for triaminoguanidine and water from the product.

3. The process according to claim 2 wherein the acid salt of triaminoguanidine is the hydrochloride salt.

4. A process according to claim 3 wherein the water solvent is dimethylformamide.

5. A process for the preparation of triaminoguanidine, which comprises contacting an aqueous solution of an acid salt of triaminoguanidine with a strongly basic quaternary ammonium anion exchange resin in the hydroxyl form to convert the acid salt in the solution to triaminoguanidine, distilling the so-formed aqueous solution of triaminoguanidine at a temperature below 50° C. to remove the water until the concentration of triaminoguanidine in the solution reaches 2 to 7 molar, adding to the concentrated solution from 2 to 10 volumes of an organic solvent in which water is soluble, said organic solvent being substantially a nonsolvent for triaminoguanidine, for each volume of the concentrate solution, said addition being carried out in the substantial absence of oxygen, continuing the distillation until at least the mixture becomes essentially saturated with respect to the triaminoguanidine, cooling the mixture to crystallize the triaminoguanidine, separating the crystallized triaminoguanidine, washing the crystallized triaminoguanidine in a water-miscible volatile liquid inert to triaminoguanidine to remove substantially all of the water, and drying the washed triaminoguanidine in the substantial absence of oxygen at a temperature below 50° C.

6. A process according to claim 5 wherein the acid salt of triaminoguanidine is triaminoguanidine hydrochloride and the water solvent is dimethylformamide.

References Cited by the Examiner

UNITED STATES PATENTS 2,801,224  7/1957  Greer _____ 260—2.1
2,929,699  3/1960  Audrieth et al. _____ 260—501

(Other references on following page)

OTHER REFERENCES

Broughton, "Technique of Organic Chemistry," vol. III, 1950, pp. 633, Interscience Publishers, Inc., New York.

Lindsay et al., Industrial & Engr. Chem., vol. 43, No. 5, pages 1085–1087 (1951).

Tipson, "Technique of Organic Chemistry," vol. III, 1950, pages 479–481, Interscience Publishers, Inc., New York.

Wheaton et al., Industrial & Engr. Chem., vol. 43, No. 5, pages 1088–1093.

CHARLES B. PARKER, *Primary Examiner.*

ROGER L. CAMPBELL, L. D. ROSDOL, CARL D. QUARFORTH, *Examiners.*